United States Patent
Li et al.

(10) Patent No.: US 11,386,249 B1
(45) Date of Patent: Jul. 12, 2022

(54) SYSTEMS AND METHODS FOR DISTRIBUTED FRACTURE SIMULATION

(71) Applicant: Ansys, Inc., Canonsburg, PA (US)

(72) Inventors: Shanhu Li, Sewickley, PA (US);
Guoyu Lin, Pittsburgh, PA (US);
Jeffrey R. Beisheim, Canonsburg, PA (US); Rajanikanth Jayaseelan, Bridgeville, PA (US)

(73) Assignee: Ansys, Inc., Canonsburg, PA (US)

( * ) Notice: Subject to any disclaimer, the term of this patent is extended or adjusted under 35 U.S.C. 154(b) by 22 days.

(21) Appl. No.: 17/130,019

(22) Filed: Dec. 22, 2020

Related U.S. Application Data

(60) Provisional application No. 62/958,122, filed on Jan. 7, 2020.

(51) Int. Cl.
| | | |
|---|---|---|
| *G06F 17/10* | (2006.01) | |
| *G06F 30/20* | (2020.01) | |
| *G06F 9/50* | (2006.01) | |
| *G06F 9/48* | (2006.01) | |
| *G06F 111/10* | (2020.01) | |
| *G06F 30/23* | (2020.01) | |

(52) U.S. Cl.
CPC ............ *G06F 30/20* (2020.01); *G06F 9/4881* (2013.01); *G06F 9/5027* (2013.01); *G06F 30/23* (2020.01); *G06F 2111/10* (2020.01)

(58) Field of Classification Search
CPC .................. G06F 17/5009; G06F 17/5018
USPC .............................................. 703/6
See application file for complete search history.

(56) References Cited

U.S. PATENT DOCUMENTS

| | | | |
|---|---|---|---|
| 7,516,053 B1* | 4/2009 | Lu | G06F 30/23 703/7 |
| 10,330,645 B2* | 6/2019 | Huang | G01N 29/4454 |

* cited by examiner

*Primary Examiner* — Andy Ho
(74) *Attorney, Agent, or Firm* — Jones Day

(57) ABSTRACT

Systems and methods are provided for simulating propagation of cracks in an object in a physical system. Data indicative of the object in the physical system is received, where the object includes a plurality of cracks. Characteristics of each of the plurality of cracks are determined based on the data, and a weight value is calculated for each of the plurality of cracks based on the determined characteristics. A group of one or more processors is assigned to simulate behavior of each crack, where a number of processors assigned to each group is based on the calculated weight value associated with that crack. Simulation data is received from each of the groups of processors, and the simulation data is stored in a non-transitory computer-readable medium.

20 Claims, 11 Drawing Sheets

202

204

206

802

| # of Elem:    | 54K              |
| # of Node:    | 85K              |
| # of Crack Tips | 9 for each crack |
| # of CPUs    | 8                |

| Rank  | 0 | 1 | 2 | 3 | 4 | 5 | 6 | 7    |
|-------|---|---|---|---|---|---|---|------|
| Crack |   |   |   |   |   | I | II | III,IV |
| Comm. | R | G | B | B | B | R | G | B    |

Communicator R: Master 5, Worker 0
Communicator G: Master 6, Worker 1
Communicator B: Master 7, Worker 2,3,4

SYSTEMS AND METHODS FOR DISTRIBUTED FRACTURE SIMULATION

CROSS-REFERENCE TO RELATED APPLICATIONS

This application claims priority to U.S. Provisional Application No. 62/958,122, entitled "Systems and Methods for Distributed Parallel Fracture Simulation," filed Jan. 7, 2020, the entirety of which is herein incorporated by reference.

BACKGROUND

Fracture mechanics is the field of mechanics concerned with the study of cracks in material components. It applies the physics of stress and strain behavior of materials, such as theories of elasticity and plasticity, to small defects (e.g., crystallographic defects) found in physical materials in order to predict the macroscopic mechanical behavior of those bodies.

SUMMARY

Systems and methods are provided for simulating propagation of cracks in an object in a physical system. Data indicative of the object in the physical system is received, where the object includes a plurality of cracks. Characteristics of each of the plurality of cracks are determined based on the data, and a weight value is calculated for each of the plurality of cracks based on the determined characteristics. A group of one or more processors is assigned to simulate behavior of each crack, where a number of processors assigned to each group is based on the calculated weight value associated with that crack. Simulation data is received from each of the groups of processors, and the simulation data is stored in a non-transitory computer-readable medium.

As another example, a computer-implemented system for simulating propagation of cracks in an object in a physical system includes a plurality of data processors and a crack analysis software module. The crack analysis software module is configured to receive data indicative of the object in the physical system, where the object includes a plurality of cracks, determine characteristics of each of the plurality of cracks based on the data, calculate a weight value for each of the plurality of cracks based on the determined characteristics, and assign the data processors to groups to simulate behavior of each crack, where a number of processors assigned to each group is based on the calculated weight value associated with that crack.

As a further example, a computer-readable medium is encoded with instructions for commanding data processors to execute steps of a method of simulating propagation of cracks in an object in a physical system. In the method, data indicative of the object in the physical system is received, where the object includes a plurality of cracks. Characteristics of each of the plurality of cracks are determined based on the data, and a weight value is calculated for each of the plurality of cracks based on the determined characteristics. A group of one or more processors is assigned to simulate behavior of each crack, where a number of processors assigned to each group is based on the calculated weight value associated with that crack. Simulation data is received from each of the groups of processors, and the simulation data is stored in a non-transitory computer-readable medium.

DETAILED DESCRIPTION

Fracture simulation may be performed in a variety of scenarios. For example, fracture simulation may be performed during a design phase of an object (e.g., a component of a system, such as an airplane or a bridge) to examine that object's ability to withstand a hypothetical fracture (e.g., a break) or a crack (e.g., a split or weakened point on the surface or in an object where the object has split without breaking into separate parts). It may be desirable to examine how well a design of the object will likely withstand a failure by simulating the object's behavior when that crack is introduced at a site where such cracks are often observed in the real world (e.g., a crack similar to what is typically seen at a root of a high speed turbofan or turbine blade (e.g., in an airplane engine, in a steam motor), a crack at a joint of a bridge, a crack at a joint between two components)). It may also be desirable to simulate behavior of a real world crack to determine its likely real world behavior to determine whether remedial behavior is warranted (e.g., using a digital twin to simulate an observed crack in a building structure, a bridge structure).

Fracture simulation can be very time consuming, where simulating the complex behavior of cracks can often take many hours, days, or longer to complete. That processing time may be reduced by parallelization, such as through the use of multiprocessor computer architectures, dividing simulation tasks across multiple computing devices (e.g., networked servers), or other computing arrangements (e.g., graphics processing units (GPUs) having an array of several/many processor/sub-processor units). Simulation speed may also be increased by assigning portions of the simulation to multiple processors in an intelligent way, such that all or most of the processors are operating for approximately the same amount of time on their portions of the simulation such that those processors have a high utilization rate during execution of the simulation (e.g., each of a plurality of processors is operating for at least 75% of the total time for all of the processors to perform parallel simulation processing). Systems and methods as disclosed herein, in embodiments, provide mechanisms for fast and accurate fracture simulation using hardware and software parallelization. For example, all available processing units in a computing resource (e.g., one computer, one server, several networked servers) are substantially equally involved in fracture simulation processing.

Figure 1:
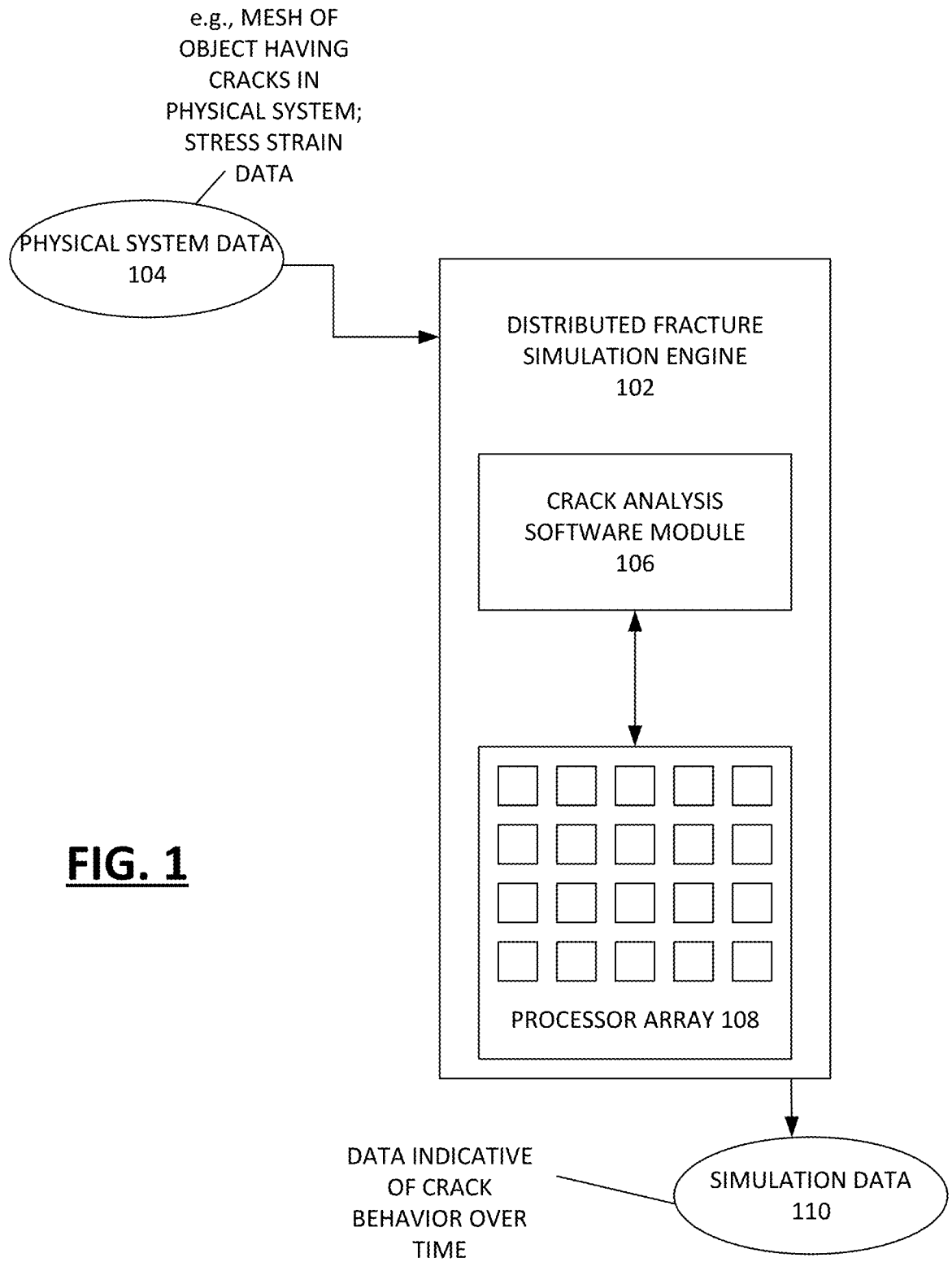
FIG. 1 is a block diagram depicting a distributed fracture simulation engine.

With reference to FIG. 1, a distributed fracture simulation engine 102 provides a system for simulating propagation of cracks in an object in a physical system (e.g., a turbine blade object in an aircraft engine physical system). The simulation engine 102 receives physical system data 104 indicative of the object in the physical system, where the object includes multiple cracks for simulation. In one example, the physical system data 104 comprises a mesh (e.g., a network formed of nodes (points) and elements within those nodes that represents characteristics of the object and its physical system, where the nodes and elements form units for calculations during simulation operations) that is representative of the object. The physical system data 104 may also include physics data, such as stress/strain characteristics of the system as provided by upstream physics calculations or simulations performed before the fracture simulation performed using the apparatus of FIG. 1. The distributed fracture simulation engine 102 accesses the physical system data 104, and a crack analysis software module 106 uses that data to determine characteristics of each of the plurality of cracks indicated in physical system data 104. The module 106 calculates a weight value for each of the plurality of cracks based on the determined characteristics. The module 106 then assigns a group of one or more processors of a processor array 108 to simulate behavior of each crack, where a number of processors assigned to each group is based on the calculated weight value associated with that crack (e.g., a group of 7 processors assigned to complex Crack 1, a group of 2 processors assigned to less-complex Crack 2). The groups of processors operate on their assigned crack simulations in parallel and then transmit data back to the crack analysis software module 106, which receives and stores the simulation data from the groups of processors in a non-transitory computer-readable medium. That simulation data is output at 110, either as is or with further processing by the simulation engine 102 (e.g., to compile/synthesize results from each of the groups of processors) as data 110 indicative of behavior of the cracks in the object over time.

Figure 2:
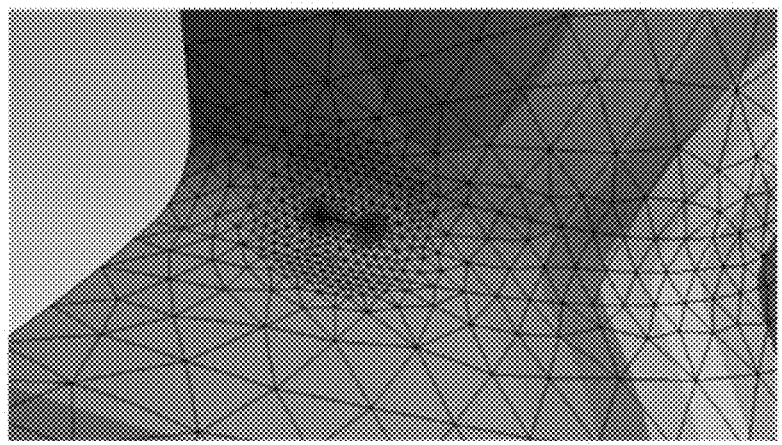
FIG. 2 is a diagram depicting an initial state of an object having a crack in a physical system and the simulated progression of that crack over a time as ascertained via simulation.
Figure 2:
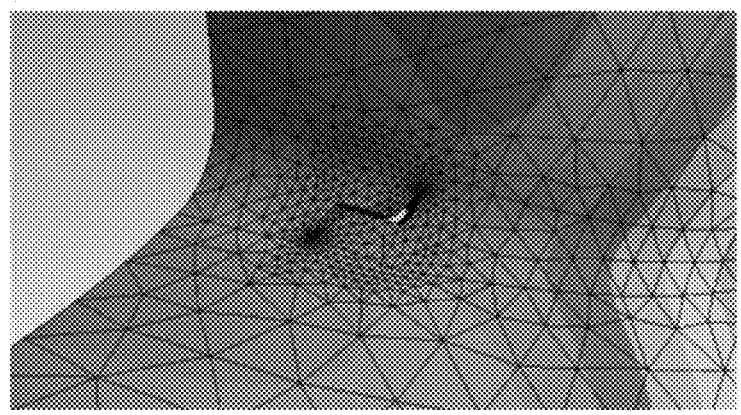
Figure 2:
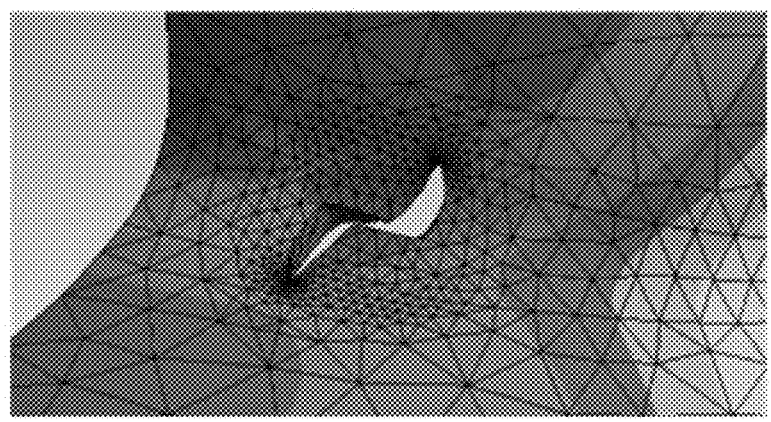

FIG. 2 is a diagram depicting an initial state of an object having a crack in a physical system and the simulated progression of that crack over a time as ascertained via simulation. The diagram at 202 is a graphical representation of a mesh representative of the cracked object, where a crack is illustrated in its initial state at a junction between two portions of an object (e.g., at a weld where two components, such as pipes, are joined). It is noted that the mesh shown at 202 is more dense (e.g., nodes are closer together, elements are smaller) near the crack which enables higher resolution and more precise simulation in the region of interest near that mesh portion. The mesh that is graphically illustrated at 202 is received by the distributed fracture simulation engine 102 as physical system data 104, alone or in combination with other data (e.g., physical system stress/strain data computed previously or by other components). The crack analysis software module 106 of the simulation engine 102 distributes the crack depicted at 202 and other cracks in that object among intelligently-sized groups of processors (e.g., groups of processors sized according to crack complexity) to simulate behavior of the cracks over time. In the example of FIG. 2, at 204, the crack shown in its initial state at 202 has progressed by kinking to the pipe access (e.g., based on a pressure load). As evident in the progression from 202 to 204 to 206, the simulated crack grows, cuts through the pipe, splits to multiple cracks, and then merges into one large crack.

This simulation may be used in a digital twin-type application, where the state of the object at 202 is based on observation/measurement of a real world object. The simulation is performed to determine the likely future behavior of that crack to determine whether remedial action should be taken and when (e.g., action should be taken quickly if fast deterioration of a critical part is forecast by the simulation). If the simulated part is a critical component of a system (e.g., a joint in an actively used bridge), it may be important that the simulation be completed quickly, such as in seconds or minutes, where fast determination of the correct remedial action (e.g., repair, replace, no action) is of critical importance.

Figure 3:
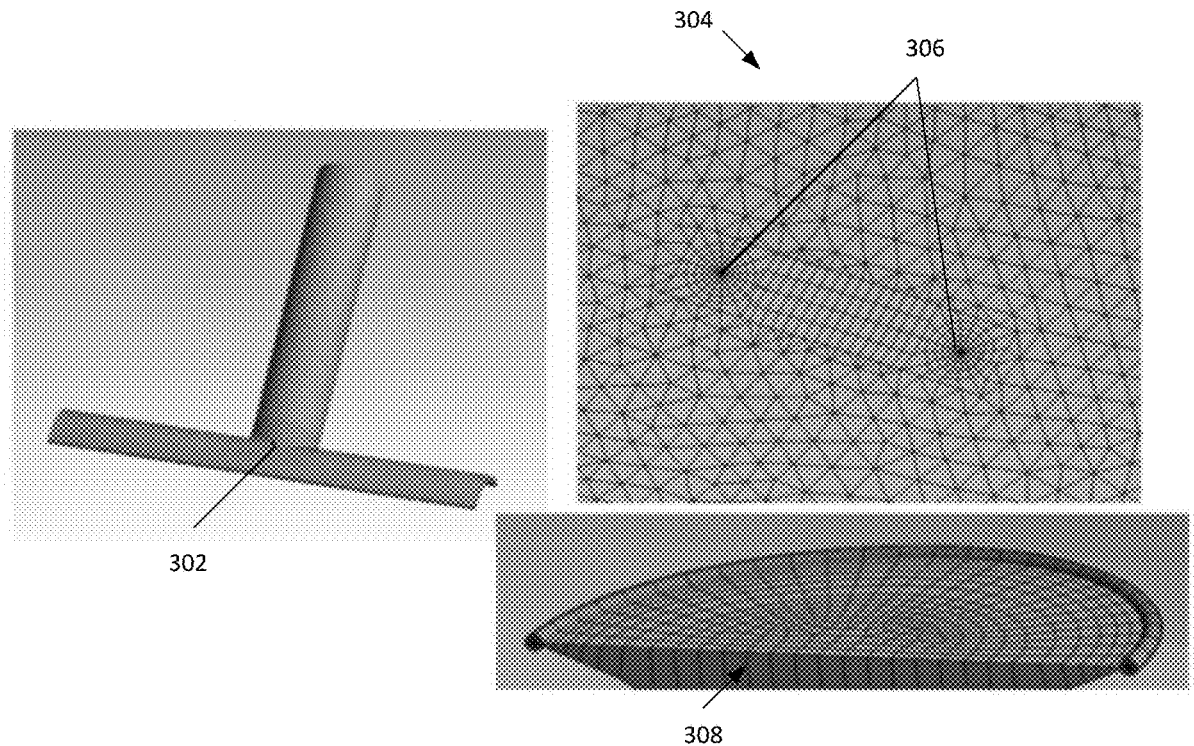
FIG. 3 is a diagram depicting characteristics of a mesh representing a pipe joint with a crack thereon.
Figure 3:
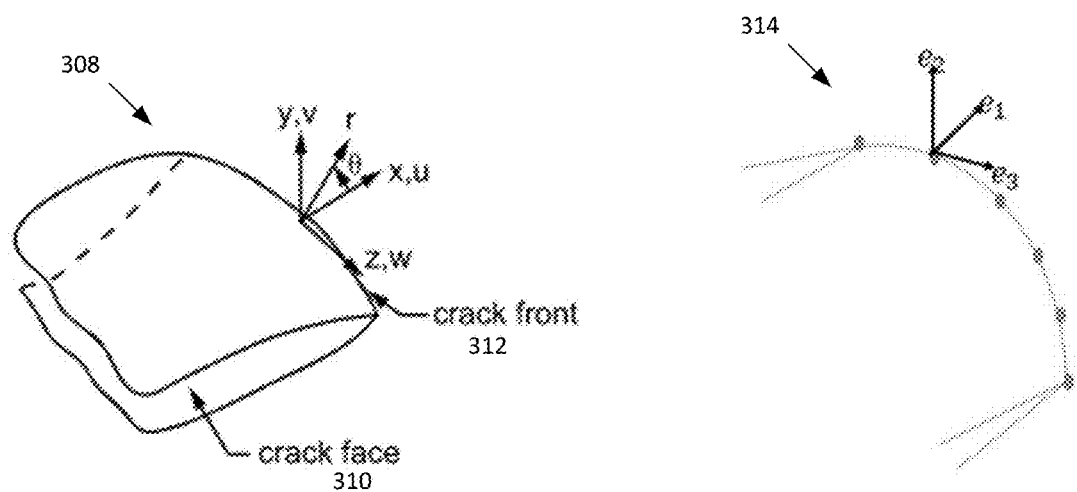

FIG. 3 is a diagram depicting characteristics of a mesh representing a pipe joint with a crack thereon. The location of the crack on the object is illustrated at 302. At 304 an enlarged surface view of the object is shown, where the ends of the crack in the object are shown at 306 where the crack begins its penetration into the object. The view at 304 illustrates one mechanism for increasing the density of the mesh near the crack, where additional mesh points are defined to form elements that surround the crack in concentric circle-type fashion. The number of rings of concentric elements around the crack may, in embodiments, be a user definably parameter where a greater number of rings (number of contours) provides higher resolution and more accurate simulation of that crack. At 308, a view of a slice taken into the object along the crack front (e.g., a curve that intersects a deepest point of the crack into the object) is shown. The crack front in this example is substantially semicircular in shape. Another visualization of the crack front is shown at 310, where crack face 310 illustrates the surface of the crack as it progresses to its deepest entry into the object at the crack front 312. Because much (most) of a crack's propagation in an object tends to be at the crack front 312, a substantial portion of simulation processing occurs at the mesh elements and nodes (crack tips) along the crack front as illustrated at 314, where calculations at normal directions (perpendicular) from nodes along the crack front are illustrated. The denser the mesh near the crack front, and therefore the more nodes along that crack front, is indicative of the complexity of the simulation processing for that crack and the computing resources needed to simulate behavior of that particular crack.

Figure 4:
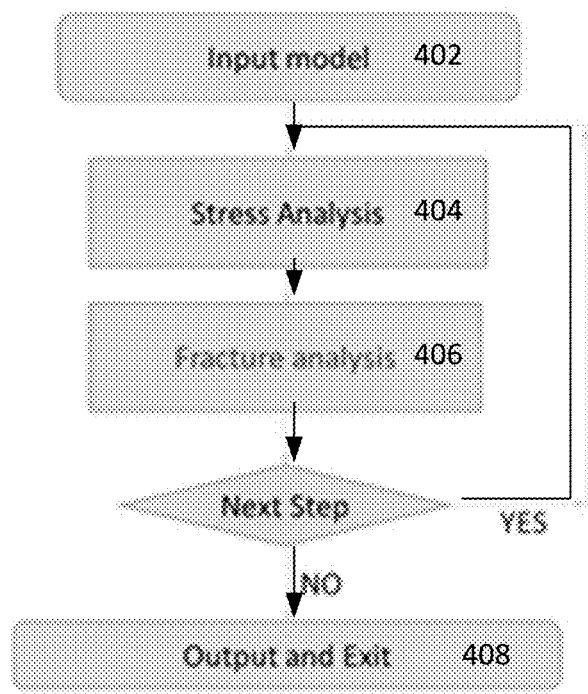
FIG. 4 is a flow diagram depicting a simulation process for predicting behavior of an object having multiple cracks or portions of cracks that can be divided for processing among a plurality of processor groups.

FIG. 4 is a flow diagram depicting a simulation process for predicting behavior of an object having multiple cracks or portions of cracks that can be divided for processing among a plurality of processor groups. An input model (e.g., a mesh representative of a cracked object in a physical system is received at 402. Physics processing, such as stress analysis, is performed at 404 to identify forces acting on the object and other characteristics of the physical system. That analysis at 404 may be performed using finite element analysis techniques, which may be parallelized. Fracture analysis (e.g., simulation by a distributed fracture simulation engine as described herein) is performed at 406. In one embodiment, to simulate behavior of the cracked object over time, the stress analysis at 404 and fracture analysis at 406 may be performed in an iterative fashion to simulate crack progression over a period of cycles, where physics parameters (e.g. stress/strain characteristics) are updated through each iteration at 404 followed by simulation of crack propagation at 406 and updating of the state of the object for the next iteration of stress analysis at 404. Once a desired number of cycles are performed (e.g., to simulate behavior over a user-defined period of time, to simulate behavior until a steady state is reached (e.g., crack propagation of less than a threshold amount or zero progression across one or more cycles), the iterations may cease with simulation data being output at 408.

Figure 5:
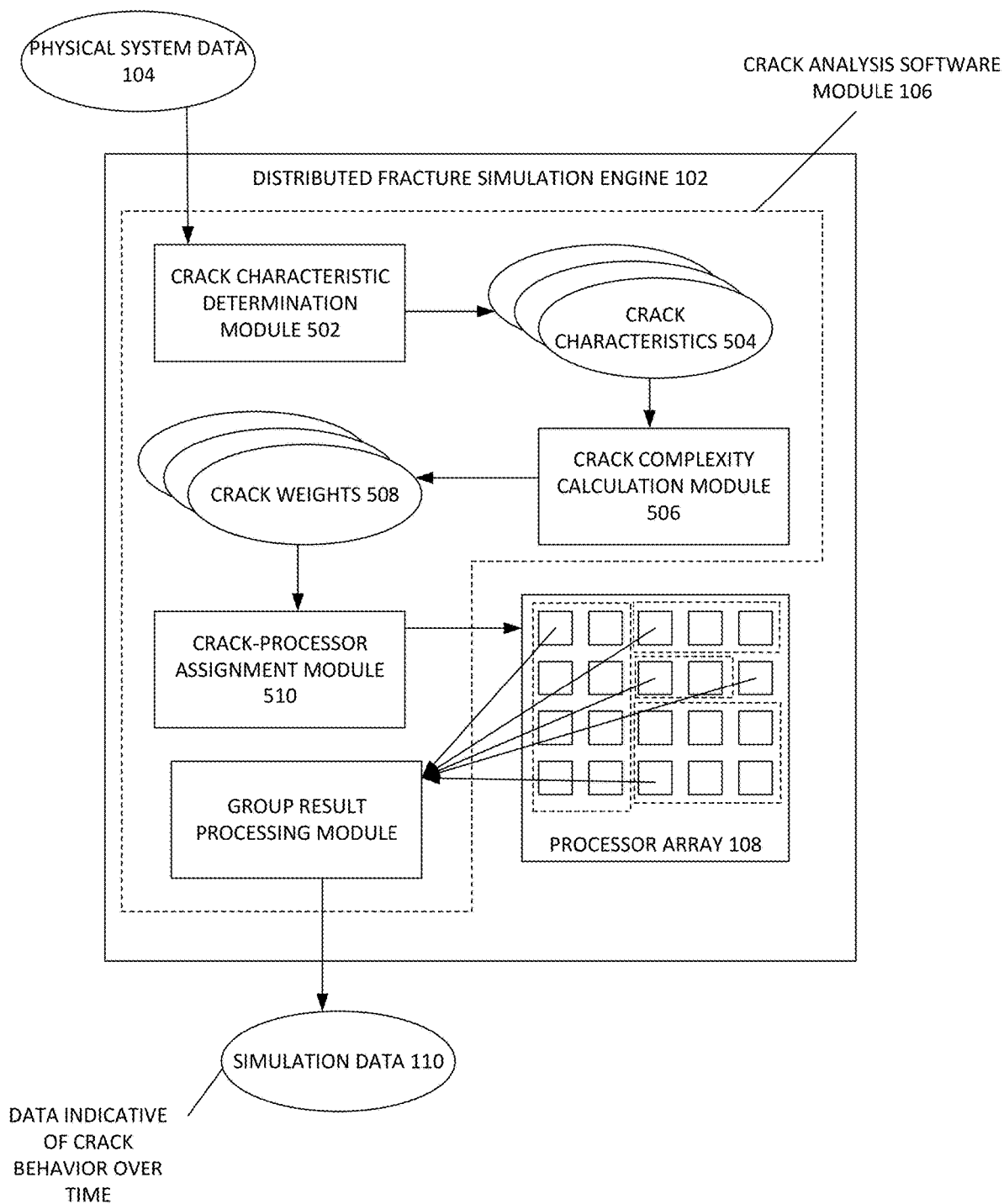
FIG. 5 is a block diagram depicting an example implementation of a distributed fracture simulation engine.

FIG. 5 is a block diagram depicting an example implementation of a distributed fracture simulation engine. The distributed fracture simulation engine 102 receives data 104 indicative of the object in the physical system, where the object includes a plurality of cracks. That data is provided to a crack analysis software module 106 that includes a crack characteristic determination module 502. That module 502 determines characteristics 504 of each of the plurality of cracks based on the received data 104. For a particular crack, those characteristics may include a number of mesh nodes along the crack front of the crack, a number of contours (e.g., concentric rings of mesh elements) surrounding the crack, a type of crack simulation to be performed on that crack (e.g., a user designated analysis type, such as J-integral analysis, stress intensity factors analysis), a shape of mesh elements in the area of the mesh surrounding or near the crack, and/or other factors as described further herein. Having determined crack characteristics 504 for each crack, a crack complexity calculation module 506 calculates a weight value 508 for each of the plurality of cracks based on the determined characteristics. In one example, the weight value for a particular crack ($W_{Crack}$) is calculated according to:

$$W_{Crack}=M_{Tips}*L_{Countours}*F_{Type}*F_{Elem}$$

where $M_{Tips}$ is a number of nodes of a mesh that are on a curve that intersects a deepest point in the particular crack;

$L_{Countours}$ is a number indicating a number of mesh contours surrounding the particular crack (e.g., (number of contours*2−1)$^2$);

$F_{Type}$ is a value associated with a type of analysis to be performed on the particular crack; and $F_{Elem}$ is a value associated with a shape of mesh elements at the particular crack. In examples, more or fewer terms may be considered in a $W_{Crack}$ calculation, where other terms may consider other crack characteristics that may affect the complexity of a fracture simulation such as material models, types of loads simulated, etc. For example, in embodiments, a crack weight may be calculated according to:

$$W_{Crack}=M_{Tips}*L_{Countours}*F_{Type}*F_{Elem}*F_{Others}$$

where $F_{Others}$ is a value indicative of other factors that affect fracture simulation complexity for that crack.

A crack-processor assignment module 510 assigns a group of one or more processors from a processor array 108 to simulate behavior of each crack, where a number of processors assigned to each group is based on the calculated weight value 508 associated with that crack. For example, if the crack weights indicate that a first crack makes up about 40% of the required simulation processing, a second crack about 30%, a third crack about 15%, a fourth crack about 10%, and a fifth crack about 5%, then the crack-processor assignment module 510 may assigned those cracks to groups of corresponding size. For example, if 20 processors are available for simulation processing, 8 processors (40% of the available processing power if all processors are of similar capability) may be assigned to a first group for the first crack, 6 processors (30%) to the second group, 3 (15%) processors to the third group, two (10%) processors to the fourth group, and one processor (5%) to the fifth group. Assignment of processors may vary, e.g., to assign proportional processing power to each group where individual processors do not all have the same, individual processing power. In one example, processors are assigned to a particular crack according to:

$$N=W_{CrackN}(W_{Crack}+W_{CrackN+1}+W_{CrackN+2}\cdots)*\text{NumProcessors}$$

where N is a number of processors assigned to the particular crack, plus or minus one processor, $W_{CrackN}$ is the weight value associated with the particular crack, $W_{CrackN+1}$, $W_{CrackN+2}$, . . . are weight values associated with other cracks, and NumProcessors is a number of processors available to simulate crack behavior.

More specifically in one example, N for each crack is adjusted to an integer between 1 and NumProcessors. When any N, as calculated using the formula above, is not an integer, it is rounded down to the closest integer. For example, when N=3.6, it is rounded to N=3. If the closest smaller integer is 0, N is adjusted to be 1. For example, when N=0.7, it is rounded to 0, and then adjusted to N=1. In embodiments, a system will do a further check to ensure the total number of processors assigned to all cracks is equal to NumProcessors. If the total number of assigned processors is larger than NumProcessors, the largest N will be adjusted to N−1. This adjustment is repeated until the total number of processors assigned to all cracks is equal to NumProcessors. In one example where NumProcessors=8, and $N_1$=4, $N_2$=2, $N_3$=1, $N_4$=2, as determined by the above-described formula and initial adjustment, the total number of assigned processors is 4+2+1+2=9, which is larger than NumProcessors=8. The system identifies the maximum N, which is $N_1$=4, and reduces its value by 1, so the new $N_1$ is 3. Then the total number of assigned processors is 3+2+1+2=8, which matches NumProcessors, completing the example adjustment process.

Each group of processors operates on simulation of its assigned crack (e.g., for one time period, iteratively for multiple time periods), with results from each group being returned to a group result processing module 514. That group result processing module 514 receives simulation data from each group of processors of the processing array 108 and stores the simulation data in a non-transitory computer readable medium. That module then outputs that simulation data, directly or after further processing, at 110 as data indicative of behavior of the cracks over time.

Figure 6:
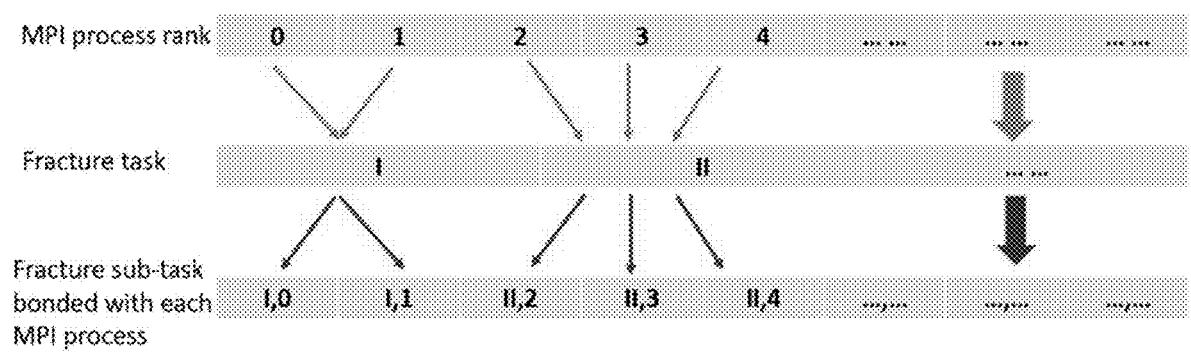
FIG. 6 is a diagram illustrating example assignment of groups of processors for fracture simulation.

FIG. 6 is a diagram illustrating example assignment of groups of processors for fracture simulation. The system includes NumProcessors total processors, where assignment of processors 0-4 is particularly depicted. Based on calculated weight values for a first crack (I) and a second crack (II), processors 0, 1 are assigned to a first group, and processors 2, 3, 4 are assigned to a second group. In an embodiment, each group of processors are assigned master/worker roles, where a master processor receives a crack processing task from the crack-processor assignment module and divides that group's crack processing task among member processors (e.g., the master processor and worker processors, the worker processors) of its group. The master processor of the group receives simulation data from the processors in its group, processes/compiles that simulation data if/as appropriate, and sends the simulation data to the group result processing module. In the example of FIG. 6, the master of the first group divides the processing work for processing the first crack (I) as evenly as possible/practicable to processors 0, 1. Similarly, the master of the second group divides the processing work for processing the second crack (II) as evenly as possible/practicable to processors 2, 3, 4.

Figure 7:
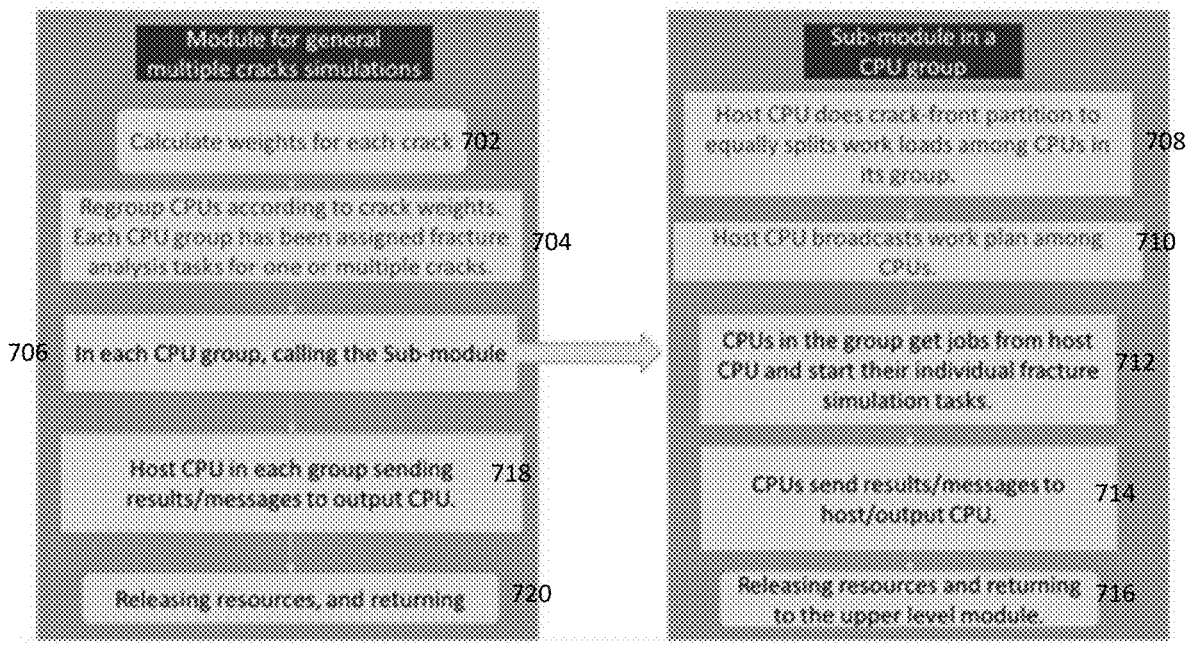
FIG. 7 is a diagram depicting an example processing flow among certain components of a distributed fracture simulation engine.

FIG. 7 is a diagram depicting an example processing flow among certain components of a distributed fracture simulation engine. At 702, a crack complexity calculation module calculates crack weights for each of the cracks based on characteristics of those cracks. At 704, a crack-processor assignment module regroups processors of the processor array 108 according to the crack weights, where each processor group is assigned fracture analysis tasks for one or more cracks. Processing progresses at 706 to each of the individual processor groups, where at 708 a host (master) processor of the group partitions the fracture analysis task among the processors in its group evenly or as evenly as practicable. The host processor broadcasts its work plan to the processors in its group at 710, where individual processors in the group perform their assigned processing at 712. At 714, the worker processors provide their partial results to the master processor of the group who generates simulation results for the assigned crack(s) and sends those simulation results to the group result processing module before releasing resources and wrapping up operations for that iteration at 716. At 718 the group result processing module receives simulation results from each of the groups of processors and outputs simulation data based on those simulation results before releasing resources and concluding operations at 720.

Figure 8:
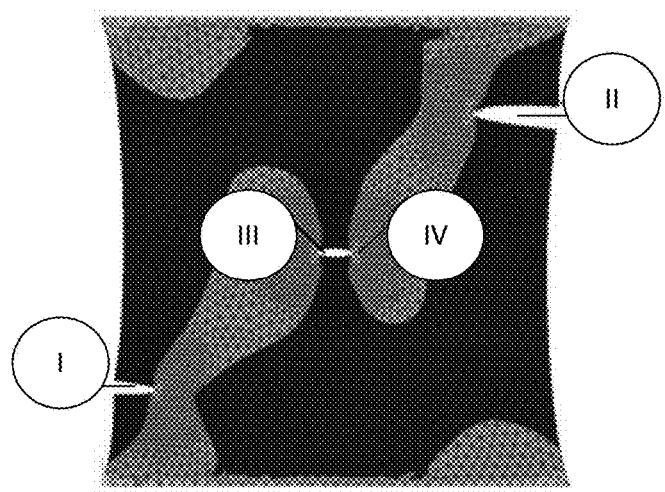
FIG. 8 is a diagram depicting an example process for assigning groups of one or more processors to simulate behavior of multiple cracks in an object.
Figure 8:
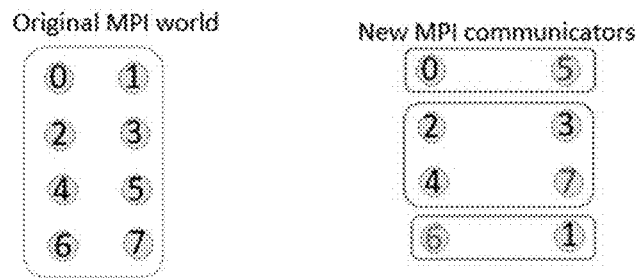

FIG. 8 is a diagram depicting an example process for assigning groups of one or more processors to simulate behavior of multiple cracks in an object. A depiction of portion of a mesh representing the object is shown at 802. The depicted area of the object includes four cracks, where two of the cracks (III, IV) form part of a single, more complex crack structure. The depicted mesh includes 54,000 elements, having 85,000 nodes. Each of the crack fronts includes 9 mesh nodes (crack tips). Eight processors are available to perform fracture simulation processing. A crack complexity calculation module calculates crack weights for each of the four cracks according to:

$$W_{Crack} = M_{Tips} * L_{Countours} * F_{Type} * F_{Elem} * F_{Others}$$

where $M_{Tips}$ is a number of nodes of a mesh that are on a curve that intersects a deepest point in the particular crack;

$L_{Countours}$ is a number indicating a number of mesh contours surrounding the particular crack (e.g., (number of contours*2−1)$^2$);

$F_{Type}$ is a value associated with a type of analysis to be performed on the particular crack;

$F_{Elem}$ is a value associated with a shape of mesh elements at the particular crack;

$F_{Others}$ is a value indicative of other factors that affect fracture simulation complexity for that crack.

Due to their close proximity, in this example, cracks III, IV are processed by a single group of processors, where processor assignment is based on the combined crack weights for cracks 3, 4. In this example, $F_{Type}$ values for each crack are selected from the following lookup table that provides $F_{Type}$ values for each of a plurality of types of fracture simulation.

| Type | J-Integral | Stress Intensity Factors | Material Force | T-Stress |
|---|---|---|---|---|
| $F_{Type}$ | 1.0 | 2.83 | 3.51 | 1.3 |

Similarly, $F_{Elem}$ values are selected from the following lookup table that provides $F_{Elem}$ values for each of a plurality of mesh element shapes, one of which is surrounding each crack.

| Type | 4-node linear tetrahedron | 10-node high order tetrahedron | 8-node linear hexahedron | 20-node high order hexahedron |
|---|---|---|---|---|
| $F_{Elem}$ | 1.0 | 2.21 | 1.9 | 3.75 |

The crack complexity calculation module calculates crack weights for each of the four cracks as follows:

| Crack ID | I | II | III | IV |
|---|---|---|---|---|
| Ftype | 1.0 | 2.83 | 1.0 | 1.0 |
| Felem | 2.21 | 2.21 | 2.21 | 2.21 |
| Lcontours | 25 | 25 | 25 | 25 |
| Mtip | 9 | 9 | 9 | 9 |
| Fothers | 1.33 | 0.44 | 1.34 | 1.15 |
| Wcracks | 661.34 | 619.17 | 666.32 | 571.84 |

Based on these weights, Crack I (661.34 of 2518.67 (26.3%) total weights) is assigned to Group R, where processor 5 is a master processor and processor 0 is a worker processor for that group. Crack II (619.17 of 2518.67 (26.3%) total weights) is assigned to Group G, where processor 6 is a master processor and processor 1 is a worker processor for that group. Cracks III and IV (1238.16 of 2518.67 (49.2%) total weights) are assigned to group B, where processor 7 is a master processor and processors 2, 3, 4 are worker processors for that group.

Systems and methods may be modified in a variety of ways, including ways to address characteristics of particular processing systems operating on simulations of physical systems as described herein. For example, a physical system being simulated may include an object that has more cracks than the simulating system has processors for simulating propagation of those cracks. In such an instance, cracks may be assigned to processors as illustrated in the following example where the object includes five cracks, but only two processors are available to simulate crack behavior. In this example, crack weight values for the five cracks are calculated as described above as follows:

| Crack ID | Weight |
|---|---|
| 1 | 33 |
| 2 | 40 |
| 3 | 59 |
| 4 | 13 |
| 5 | 21 |

The cracks are sorted by weight as follows

| Crack ID | Weight |
|---|---|
| 3 | 59 |
| 2 | 40 |

-continued

| Crack ID | Weight |
|---|---|
| 1 | 33 |
| 5 | 21 |
| 4 | 13 |

Cracks (or groups of cracks) with largest weights are combined with smallest-weight cracks (or groups of cracks), with second largest weight cracks being combined with second smallest weight cracks, etc., as follows:

| Crack ID | Weight |
|---|---|
| 3, 4 | 59 + 13 = 72 |
| 2, 5 | 40 + 21 = 61 |
| 1 | 33 |

This sorting and combining is repeated until the number of cracks, or crack groups, is less than or equal to the number of processors as follows:
Sorting:

| Crack ID | Weight |
|---|---|
| 3, 4 | 72 |
| 2, 5 | 61 |
| 1 | 33 |

Combining:

| Crack ID | Weight |
|---|---|
| 3, 4, 1 | 72 + 33 = 105 |
| 2, 5 | 61 |

Having reduced the number of crack groups to the number of processors (i.e., 2), a first processor is assigned cracks 1, 3, 4 to process, and a second processor is assigned cracks 2, 5 to process.

Figure 9:
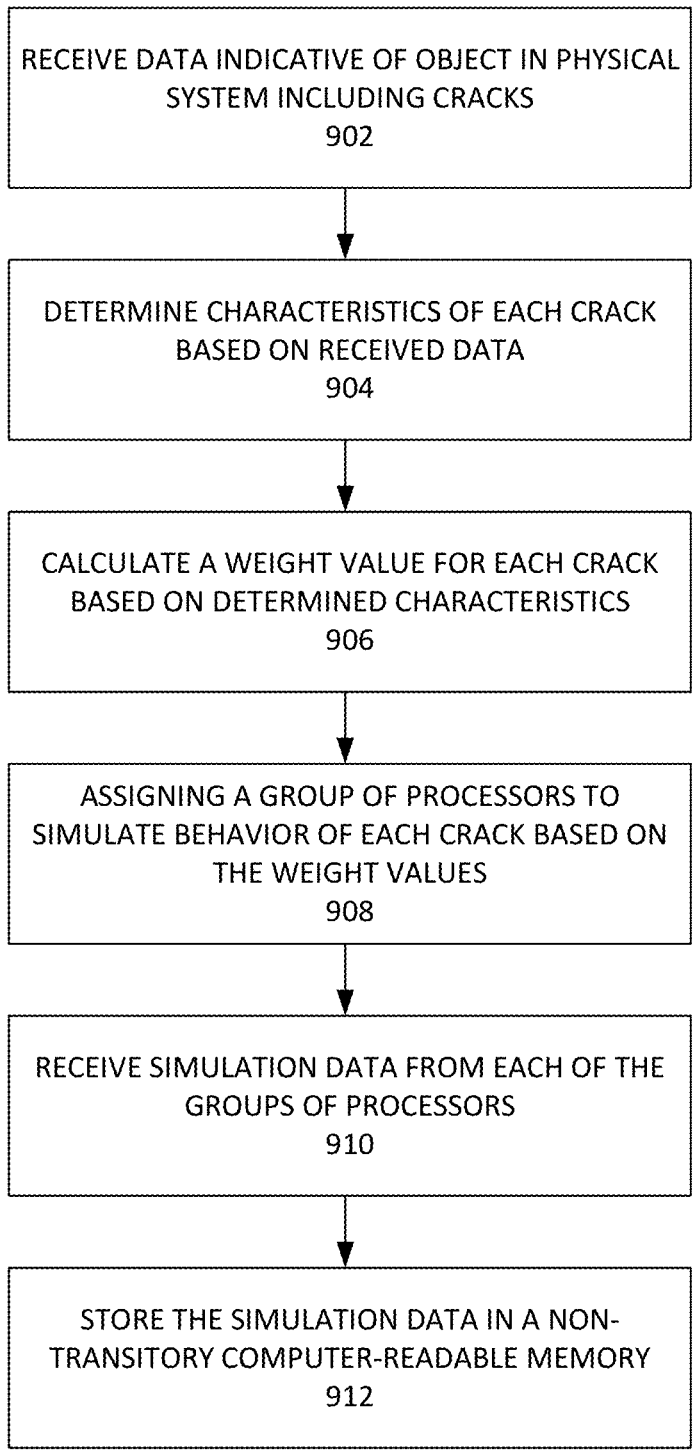
FIG. 9 is a flow diagram depicting a method of simulating propagation of cracks in an object in a physical system.

FIG. 9 is a flow diagram depicting a method of simulating propagation of cracks in an object in a physical system. At 902, data indicative of the object in the physical system is received, where the object includes a plurality of cracks. At 904, characteristics of each of the plurality of cracks are determined based on the data, and at 906 a weight value is calculated for each of the plurality of cracks based on the determined characteristics. At 908, a group of one or more processors is assigned to simulate behavior of each crack, where a number of processors assigned to each group is based on the calculated weight value associated with that crack. Simulation data is received from each of the groups of processors at 910, and the simulation data is stored in a non-transitory computer-readable medium at 912.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes. The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

Figures 10A, 10B:
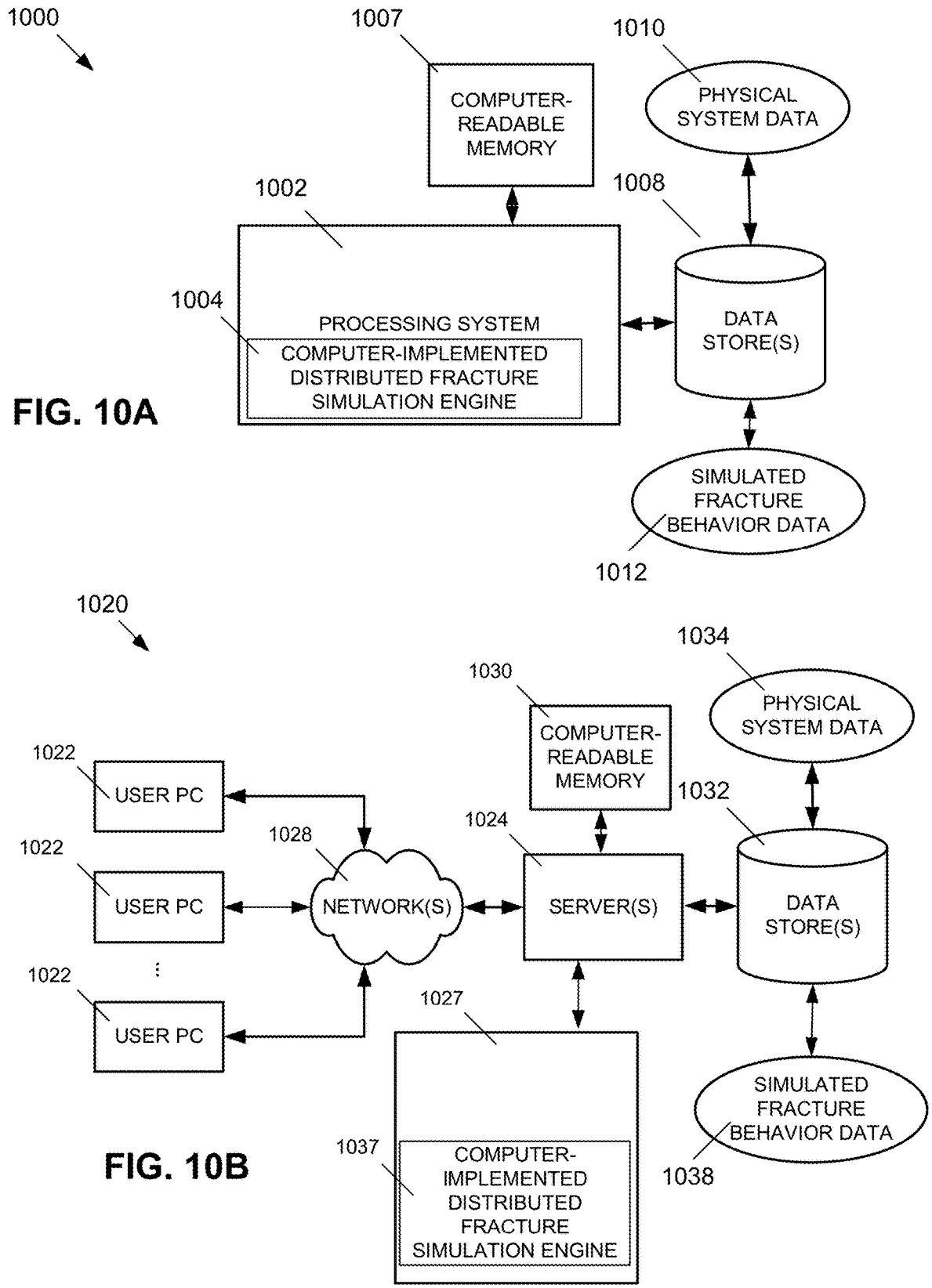
FIGS. 10A, 10B, and 10C depict example systems for implementing the approaches described herein for simulating propagation of cracks in an object.
Figure 10C:
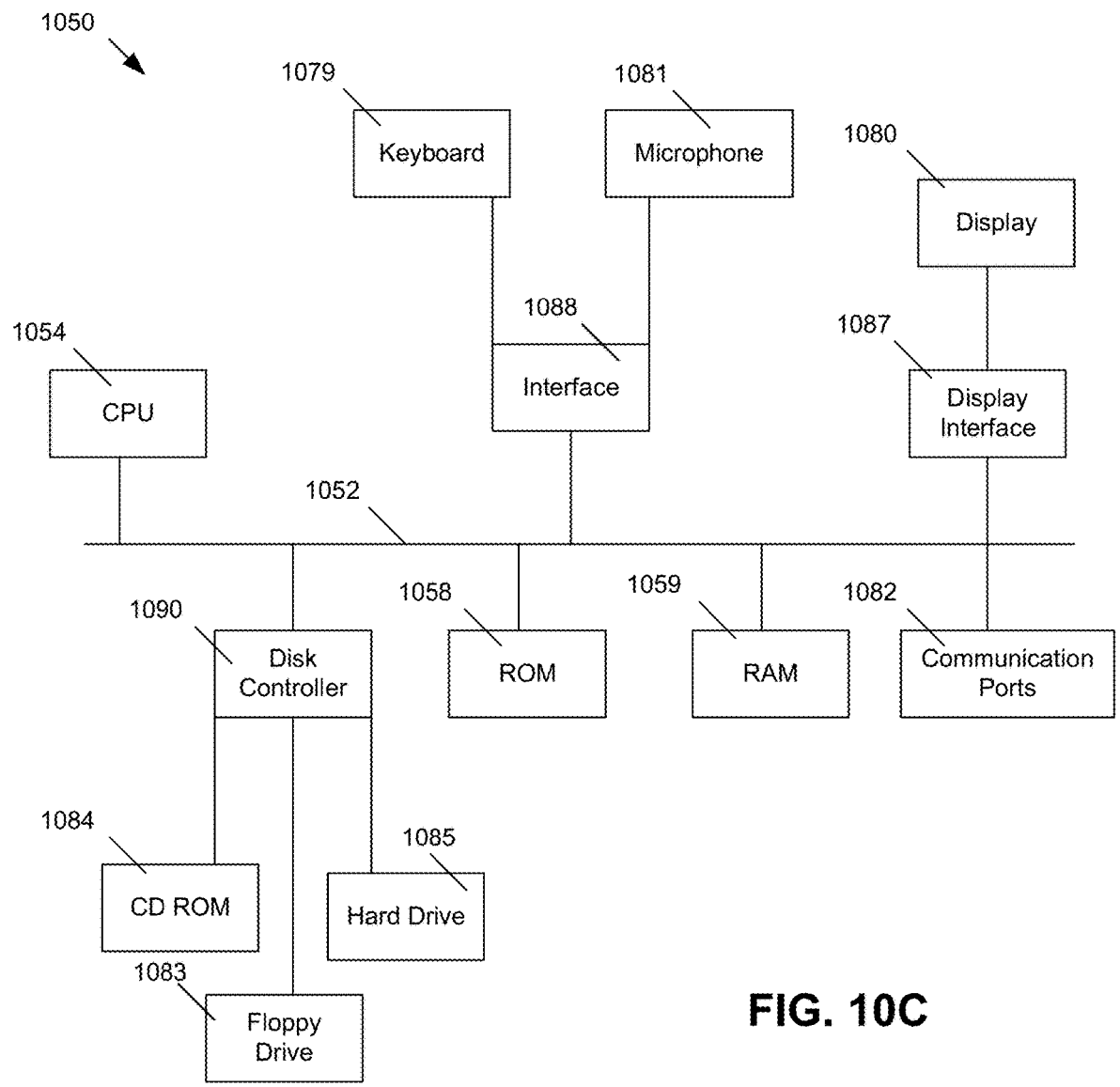

FIGS. 10A, 10B, and 10C depict example systems for implementing the approaches described herein for simulating propagation of cracks in an object. For example, FIG. 10A depicts an exemplary system 1000 that includes a standalone computer architecture where a processing system 1002 (e.g., one or more computer processors located in a given computer or in multiple computers that may be separate and distinct from one another) includes a computer-implemented distributed fracture simulation engine 1004 being executed on the processing system 1002. The processing system 1002 has access to a computer-readable memory 1007 in addition to one or more data stores 1008. The one or more data stores 1008 may include physical system data 1010 as well as simulated fracture behavior data 1012. The processing system 1002 may be a distributed parallel computing environment, which may be used to handle very large-scale data sets.

FIG. 10B depicts a system 1020 that includes a client-server architecture. One or more user PCs 1022 access one or more servers 1024 a computer-implemented distributed fracture simulation engine 1037 on a processing system 1027 via one or more networks 1028. The one or more servers 1024 may access a computer-readable memory 1030 as well as one or more data stores 1032. The one or more data stores 1032 may include physical system data 1034 as well simulated fracture behavior data 1038.

FIG. 10C shows a block diagram of exemplary hardware for a standalone computer architecture 1050, such as the architecture depicted in FIG. 10A that may be used to include and/or implement the program instructions of system embodiments of the present disclosure. A bus 1052 may serve as the information highway interconnecting the other illustrated components of the hardware. A processing system 1054 labeled CPU (central processing unit) (e.g., one or more computer processors at a given computer or at multiple computers), may perform calculations and logic operations required to execute a program. A non-transitory processor-readable storage medium, such as read only memory (ROM) 1058 and random access memory (RAM) 1059, may be in communication with the processing system 1054 and may include one or more programming instructions for performing the method of simulating propagation of cracks in an object. Optionally, program instructions may be stored on a non-transitory computer-readable storage medium such as a magnetic disk, optical disk, recordable memory device, flash memory, or other physical storage medium.

In FIGS. 10A, 10B, and 10C, computer readable memories 1007, 1030, 1058, 1059 or data stores 1008, 1032, 1083, 1084, 1088 may include one or more data structures for storing and associating various data used in the example systems for automatically simulating an integrated circuit system. For example, a data structure stored in any of the aforementioned locations may be used to store data from XML files, initial parameters, and/or data for other variables described herein. A disk controller 1090 interfaces one or more optional disk drives to the system bus 1052. These disk drives may be external or internal floppy disk drives such as 1083, external or internal CD-ROM, CD-R, CD-RW or DVD drives such as 1084, or external or internal hard drives 1085. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1090, the ROM 1058 and/or the RAM 1059. The processor 1054 may access one or more components as required.

A display interface 1087 may permit information from the bus 1052 to be displayed on a display 1080 in audio, graphic, or alphanumeric format. Communication with external devices may optionally occur using various communication ports 1082.

In addition to these computer-type components, the hardware may also include data input devices, such as a keyboard 1079, or other input device 1081, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for simulating propagation of cracks in an object in a physical system, comprising:
   receiving data indicative of the object in the physical system, wherein the object includes a plurality of cracks;
   determining characteristics of each of the plurality of cracks based on the data;
   calculating a weight value for each of the plurality of cracks based on the determined characteristics;
   assigning a group of one or more processors to simulate behavior of each crack, a number of processors assigned to each group being based on the calculated weight value associated with that crack;
   receiving simulation data from each of the groups of processors; and
   storing the simulation data in a non-transitory computer-readable medium.

2. The method of claim 1, wherein each group of one or more processors comprises a master processor, wherein the method further comprises the master processor of a particular group associated with a particular crack:
   distributing processing tasks to each processor in the particular group;
   receiving processing task results from each processor in the particular group;
   calculating particular simulation data based on the processing task results; and
   transmitting the particular simulation data from the particular group.

3. The method of claim 1, wherein the data indicative of the object comprises a mesh representative of the object.

4. The method of claim 3, wherein one characteristic for a particular crack comprises a number of nodes of the mesh that are on a curve that intersects a deepest point in the particular crack.

5. The method of claim 1, wherein one characteristic for a particular crack comprises a type of analysis to be performed in simulating behavior of the particular crack.

6. The method of claim 5, wherein the type of analysis is user defined.

7. The method of claim 1, wherein one characteristic for a particular crack comprises a mesh element shape associated with mesh elements associated with the particular crack.

8. The method of claim 7, wherein the mesh element shape is one of: an m-node linear tetrahedron element, an n-node linear hexahedron element, an x-node high order tetrahedron element, and a y-node high order hexahedron element.

9. The method of claim 1 further comprising:
   performing a stress on the object in the physical system to determine a stress parameter, wherein the stress parameter is provided to one or more of the groups of processors prior to the groups of processors simulating behavior of the plurality of cracks.

10. The method of claim 1, wherein the weight value for a particular crack ($W_{Crack}$) is calculated according to:

$$W_{Crack} = M_{Tips} * L_{Countours} * F_{Type} * F_{Elem} * F_{Others}$$

wherein $M_{Tips}$ is a number of nodes of a mesh that are on a curve that intersects a deepest point in the particular crack;

$L_{Countours}$ is a number indicating a number of mesh contours surrounding the particular crack ($L_{Countours}$ = (number of contours*2−1)$^2$);

$F_{Type}$ is a value associated with a type of analysis to be performed on the particular crack;

$F_{Elem}$ is a value associated with a shape of mesh elements at the particular crack; and $F_{Others}$ is a value indicative of other factors that affect fracture simulation complexity for that crack.

11. The method of claim 10, wherein $W_{Crack}$ is further based on addition of further terms which are based on additional characteristics of the particular crack.

12. The method of claim 1, wherein processors are assigned to a particular crack according to:

$$N = W_{CrackN}/(W_{Crack} + W_{CrackN+1} + W_{CrackN+2}) * \text{NumProcessors}$$

where N is a number of processors assigned to the particular crack, plus or minus one processor, $W_{CrackN}$ is the weight value associated with the particular crack, $W_{CrackN+1}$, $W_{CrackN+2}$, ... are weight values associated with other cracks, and NumProcessors is a number of processors available to simulate crack behavior.

13. A computer-implemented system, for simulating propagation of cracks in an object in a physical system, comprising:
  a plurality of data processors;
  a crack analysis software module configured to:
    receive data indicative of the object in the physical system, wherein the object includes a plurality of cracks;
    determine characteristics of each of the plurality of cracks based on the data;
    calculate a weight value for each of the plurality of cracks based on the determined characteristics;
    assign the data processors to groups to simulate behavior of each crack, a number of processors assigned to each group being based on the calculated weight value associated with that crack.

14. The system of claim 13, wherein the crack analysis software module is further configured to:
  receive simulation data from each of the groups of processors; and
  store the simulation data in a non-transitory computer-readable medium.

15. The system of claim 13, wherein each group of one or more processors comprises a master processor, wherein the master processor of a particular group associated with a particular crack is configured to:
  distribute processing tasks to each processor in the particular group;
  receive processing task results from each processor in the particular group;
  calculate particular simulation data based on the processing task results; and
  transmit the particularly simulation data from the particular group.

16. The system of claim 13, wherein one characteristic for a particular crack comprises a number of nodes of the mesh that are on a curve that intersects a deepest point in the particular crack.

17. The system of claim 13, wherein one characteristic for a particular crack comprises a type of analysis to be performed in simulating behavior of the particular crack.

18. The system of claim 13, wherein one characteristic for a particular crack comprises a mesh element shape associated with mesh elements associated with the particular crack.

19. The system of claim 13, wherein the weight value for a particular crack ($W_{Crack}$) is calculated according to:

$$W_{Crack} = M_{Tips} * L_{Countours} * F_{Type} * F_{Elem} * F_{Others}$$

wherein $M_{Tips}$ is a number of nodes of a mesh that are on a curve that intersects a deepest point in the particular crack;

$L_{Countours}$ is a number indicating a number of mesh contours surrounding the particular crack;

$F_{Type}$ is a value associated with a type of analysis to be performed on the particular crack;

$F_{Elem}$ is a value associated with a shape of mesh elements at the particular crack; and $F_{Others}$ is a value indicative of other factors that affect fracture simulation complexity for that crack.

20. A computer-readable medium encoded with instructions for commanding data processors to execute steps of a method of simulating propagation of cracks in an object in a physical system, the steps comprising:
  receiving data indicative of the object in the physical system, wherein the object includes a plurality of cracks;
  determining characteristics of each of the plurality of cracks based on the data;
  calculating a weight value for each of the plurality of cracks based on the determined characteristics;
  assigning a group of one or more processors to simulate behavior of each crack, a number of processors assigned to each group being based on the calculated weight value associated with that crack;
  receiving simulation data from each of the groups of processors; and
  storing the simulation data in a non-transitory computer-readable medium.

* * * * *